(12) United States Patent
Vannithamby et al.

(10) Patent No.: US 9,794,870 B2
(45) Date of Patent: Oct. 17, 2017

(54) USER EQUIPMENT AND METHOD FOR USER EQUIPMENT FEEDBACK OF FLOW-TO-RAT MAPPING PREFERENCES

(71) Applicant: Intel Corporation, Santa Clara, CA (US)

(72) Inventors: Rath Vannithamby, Portland, OR (US); Satish Chandra Jha, Hillsboro, OR (US); Ali Koc, Hillsboro, OR (US); Maruti Gupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/136,554

(22) Filed: Dec. 20, 2013

(65) Prior Publication Data

US 2015/0004980 A1 Jan. 1, 2015

Related U.S. Application Data

(60) Provisional application No. 61/841,230, filed on Jun. 28, 2013.

(51) Int. Cl.
*H04W 88/06* (2009.01)
*H04W 48/18* (2009.01)
*H04W 28/18* (2009.01)

(52) U.S. Cl.
CPC ............ *H04W 48/18* (2013.01); *H04W 28/18* (2013.01); *H04W 88/06* (2013.01)

(58) Field of Classification Search
CPC .................................................. H04W 88/06
See application file for complete search history.

(56) References Cited

U.S. PATENT DOCUMENTS

| 8,160,976 B2* | 4/2012 | Dwyer ............. H04W 36/0066 706/12 |
| 8,170,081 B2 | 5/2012 | Forenza et al. |
| 8,213,978 B1 | 7/2012 | Ho et al. |
| 8,259,599 B2 | 9/2012 | Ghady et al. |
| 8,462,688 B1 | 6/2013 | Dinan |
| 8,547,969 B2* | 10/2013 | Watfa .................. H04W 76/027 370/352 |
| 8,565,793 B1* | 10/2013 | Koodli .................. H04W 68/04 370/329 |

(Continued)

FOREIGN PATENT DOCUMENTS

| CN | 102484885 A | 5/2012 |
| CN | 102948216 A | 2/2013 |

(Continued)

OTHER PUBLICATIONS

US 9,635,667, 04/2017, Shirani-Mehr et al. (withdrawn)

(Continued)

*Primary Examiner* — Asghar Bilgrami
(74) *Attorney, Agent, or Firm* — Schwegman Lundberg & Woessner, P.A.

(57) ABSTRACT

An embodiment of methods and user equipment are disclosed. Once such method includes a user equipment transmitting preferences for Flow-to-RAT mapping to a base station of a network. The user equipment may receive a Flow-to-RAT mapping from the base station that specifies a particular RAT to be associated with a particular Flow.

9 Claims, 3 Drawing Sheets

(56) References Cited

U.S. PATENT DOCUMENTS

| | | | |
|---|---|---|---|
| 8,654,815 B1 | 2/2014 | Forenza et al. | |
| 8,682,354 B2 | 3/2014 | Zhong et al. | |
| 8,965,338 B2* | 2/2015 | Luft | G06Q 30/0205 |
| | | | 370/235 |
| 9,025,479 B2 | 5/2015 | Gaal et al. | |
| 9,046,591 B1 | 6/2015 | Yang et al. | |
| 9,179,328 B2 | 11/2015 | Li et al. | |
| 9,320,063 B2 | 4/2016 | Zaus | |
| 9,655,107 B2 | 5/2017 | Shirani-Mehr et al. | |
| 9,750,017 | 8/2017 | Zaus | |
| 2004/0014501 A1 | 1/2004 | Kuwahara et al. | |
| 2006/0007043 A1 | 1/2006 | Xin | |
| 2007/0211813 A1 | 9/2007 | Talwar et al. | |
| 2009/0323841 A1 | 12/2009 | Clerckx et al. | |
| 2010/0046643 A1 | 2/2010 | Mondal et al. | |
| 2010/0054237 A1 | 3/2010 | Han et al. | |
| 2010/0056216 A1 | 3/2010 | Li | |
| 2010/0265841 A1 | 10/2010 | Rong et al. | |
| 2010/0316154 A1 | 12/2010 | Park et al. | |
| 2011/0069618 A1 | 3/2011 | Wong et al. | |
| 2011/0103305 A1 | 5/2011 | Ali et al. | |
| 2011/0143759 A1 | 6/2011 | Choi et al. | |
| 2011/0149852 A1 | 6/2011 | Olsson et al. | |
| 2011/0164668 A1 | 7/2011 | Hoek et al. | |
| 2011/0164696 A1 | 7/2011 | Choi et al. | |
| 2011/0194638 A1 | 8/2011 | Erell et al. | |
| 2011/0216846 A1 | 9/2011 | Lee, II et al. | |
| 2011/0244847 A1 | 10/2011 | Mallik et al. | |
| 2011/0249637 A1 | 10/2011 | Hammarwall et al. | |
| 2011/0268101 A1 | 11/2011 | Wang et al. | |
| 2012/0014462 A1 | 1/2012 | Zummo et al. | |
| 2012/0071163 A1 | 3/2012 | Klingenbrunn et al. | |
| 2012/0082082 A1* | 4/2012 | Etemad | H04W 72/1215 |
| | | | 370/312 |
| 2012/0120789 A1 | 5/2012 | Ramachandran et al. | |
| 2012/0128089 A1 | 5/2012 | Tsutsui | |
| 2012/0163235 A1 | 6/2012 | Ho et al. | |
| 2012/0165019 A1 | 6/2012 | Shintani et al. | |
| 2012/0252429 A1 | 10/2012 | Yoshizawa | |
| 2012/0258729 A1 | 10/2012 | Siomina et al. | |
| 2012/0281783 A1 | 11/2012 | Cheng et al. | |
| 2012/0322489 A1 | 12/2012 | Liu et al. | |
| 2013/0021925 A1 | 1/2013 | Yin et al. | |
| 2013/0034082 A1 | 2/2013 | Etemad et al. | |
| 2013/0039244 A1 | 2/2013 | Sun | |
| 2013/0064129 A1 | 3/2013 | Koivisto et al. | |
| 2013/0070703 A1 | 3/2013 | Yasukawa et al. | |
| 2013/0077513 A1 | 3/2013 | Ng et al. | |
| 2013/0083661 A1 | 4/2013 | Gupta et al. | |
| 2013/0083777 A1 | 4/2013 | Rydnell et al. | |
| 2013/0088983 A1* | 4/2013 | Pragada | H04W 16/14 |
| | | | 370/252 |
| 2013/0107849 A1 | 5/2013 | Park | |
| 2013/0107977 A1 | 5/2013 | Lakkis | |
| 2013/0114576 A1 | 5/2013 | Kwon et al. | |
| 2013/0121185 A1 | 5/2013 | Li et al. | |
| 2013/0153298 A1 | 6/2013 | Pietraski et al. | |
| 2013/0155962 A1 | 6/2013 | Hakola et al. | |
| 2013/0157670 A1 | 6/2013 | Koskela et al. | |
| 2013/0163457 A1 | 6/2013 | Kim et al. | |
| 2013/0201852 A1 | 8/2013 | Chou et al. | |
| 2013/0201884 A1* | 8/2013 | Freda | H04W 72/005 |
| | | | 370/278 |
| 2013/0230081 A1 | 9/2013 | Wernersson et al. | |
| 2013/0273924 A1 | 10/2013 | Hakola et al. | |
| 2013/0288608 A1 | 10/2013 | Fwu et al. | |
| 2014/0010221 A1* | 1/2014 | Panian | H04W 76/02 |
| | | | 370/338 |
| 2014/0024386 A1* | 1/2014 | Novak | H04W 72/082 |
| | | | 455/452.1 |
| 2014/0050086 A1* | 2/2014 | Himayat | H04N 21/2365 |
| | | | 370/230 |
| 2014/0056246 A1 | 2/2014 | Chun et al. | |
| 2014/0098900 A1 | 4/2014 | Bayesteh et al. | |
| 2014/0126549 A1 | 5/2014 | Beale | |
| 2014/0128092 A1 | 5/2014 | Xiong et al. | |
| 2014/0133401 A1 | 5/2014 | Kaura et al. | |
| 2014/0171054 A1 | 6/2014 | Cai et al. | |
| 2014/0177744 A1 | 6/2014 | Krishnamurthy | |
| 2014/0206367 A1 | 7/2014 | Agee et al. | |
| 2014/0211673 A1 | 7/2014 | Lu et al. | |
| 2014/0213259 A1 | 7/2014 | Teyeb et al. | |
| 2014/0321313 A1 | 10/2014 | Seo et al. | |
| 2014/0355562 A1 | 12/2014 | Gao et al. | |
| 2015/0003325 A1 | 1/2015 | Sajadieh et al. | |
| 2015/0003326 A1 | 1/2015 | Zaus | |
| 2015/0003338 A1 | 1/2015 | Xue et al. | |
| 2015/0003543 A1 | 1/2015 | Shirani-Mehr et al. | |
| 2015/0004995 A1 | 1/2015 | Koc et al. | |
| 2015/0056993 A1 | 2/2015 | Zhu et al. | |
| 2015/0139006 A1 | 5/2015 | Seo et al. | |
| 2015/0223197 A1 | 8/2015 | Kim et al. | |
| 2015/0282029 A1 | 10/2015 | Faccin et al. | |
| 2015/0296354 A1 | 10/2015 | Liao et al. | |
| 2015/0304953 A1 | 10/2015 | Sun | |
| 2016/0100401 A1 | 4/2016 | Xiong et al. | |
| 2016/0119967 A1 | 4/2016 | Zaus | |
| 2016/0278069 A1 | 9/2016 | Lee et al. | |

FOREIGN PATENT DOCUMENTS

| | | |
|---|---|---|
| CN | 104254067 A | 12/2014 |
| CN | 105229934 A | 1/2016 |
| CN | 105229942 A | 1/2016 |
| CN | 105230053 A | 1/2016 |
| CN | 105247924 A | 1/2016 |
| CN | 105264788 A | 1/2016 |
| CN | 105284059 A | 1/2016 |
| EP | 2590336 A1 | 5/2013 |
| EP | 3014787 A1 | 5/2016 |
| EP | 3014788 A1 | 5/2016 |
| EP | 3014790 A1 | 5/2016 |
| EP | 3014909 A1 | 5/2016 |
| EP | 3014923 A1 | 5/2016 |
| HK | 1219355 A1 | 3/2017 |
| HK | 1219356 A1 | 3/2017 |
| HK | 1219380 A1 | 3/2017 |
| JP | 2011259263 A | 12/2012 |
| KR | 1020120030548 A | 3/2012 |
| KR | 1020120138791 A | 12/2012 |
| KR | 1020130021569 A | 3/2013 |
| KR | 1020130028106 A | 3/2013 |
| KR | 1020130040749 A | 4/2013 |
| KR | 1020160003021 A | 1/2016 |
| TW | 201316712 A | 4/2013 |
| TW | 201517660 A | 5/2015 |
| WO | WO-2010043752 A1 | 4/2010 |
| WO | WO-2010088828 A1 | 8/2010 |
| WO | WO-2010150568 A1 | 12/2010 |
| WO | WO-2011138495 A1 | 11/2011 |
| WO | WO-2012000535 A1 | 1/2012 |
| WO | WO-2012125931 A1 | 9/2012 |
| WO | WO-2013010418 A1 | 1/2013 |
| WO | WO-2013012222 A2 | 1/2013 |
| WO | WO-2013081377 A1 | 6/2013 |
| WO | WO-2014158255 A1 | 10/2014 |
| WO | WO-2014209451 A1 | 12/2014 |
| WO | WO-2014210441 A1 | 12/2014 |
| WO | WO-2014210471 A1 | 12/2014 |
| WO | WO-2014210477 A1 | 12/2014 |
| WO | WO-2014210493 A1 | 12/2014 |
| WO | WO-2014210500 A1 | 12/2014 |

OTHER PUBLICATIONS

"International Application Serial No. PCT/US2014/031996, International Search Report mailed Aug. 26, 2014", 3 pgs.

"International Application Serial No. PCT/US2014/031996, Written Opinion mailed Aug. 26, 2014", 4 pgs.

"International Application Serial No. PCT/US2014/044540, International Search Report mailed Oct. 15, 2014", 3 pgs.

(56) References Cited

OTHER PUBLICATIONS

"International Application Serial No. PCT/US2014/044540, Written Opinion mailed Oct. 15, 2014", 6 pgs.
"International Application Serial No. PCT/US2014/044592, International Search Report mailed Sep. 29, 2014", 3 pgs.
"International Application Serial No. PCT/US2014/044592, Written Opinion mailed Sep. 29, 2014", 5 pgs.
"International Application Serial No. PCT/US2014/044606, International Search Report mailed Oct. 22, 2014", 3 pgs.
"International Application Serial No. PCT/US2014/044606, Written Opinion mailed Oct. 22, 2014", 6 pgs.
"International Application Serial No. PCT/US2014/044626, International Search Report mailed Oct. 22, 2014", 3 pgs.
"International Application Serial No. PCT/US2014/044626, Written Opinion mailed Oct. 22, 2014", 5 pgs.
"International Application Serial No. PCT/US2014/044640, International Search Report mailed Oct. 21, 2014", 4 pgs.
"International Application Serial No. PCT/US2014/044640, Written Opinion mailed Oct. 21, 2014", 6 pgs.
"Circuit Switched (CS) fallback in Evolved Packet System (EPS); Stage 2", 3GPP TS 23.272 V11.5.0. Technical Specification Group Services and System Aspects. Release 11., (Jun. 2013), 95 pgs.
"Evolved Universal Terrestrial Radio Access (E-UTRA); Multiplexing and channel coding", ETSI TS 136 212 V11.3.0 (3GPP TS 36.212 version 11.3.0 Release 11). LTE., (Jul. 2013), 86 pgs.
"Evolved Universal Terrestrial Radio Access (E-UTRA); Multiplexing and channel coding", 3GPP TS 36.212 V12.0.0. Technical Specification Group Radio Access Network. Release 12., (Dec. 2013), 88 pgs.
"Evolved Universal Terrestrial Radio Access (E-UTRA); Physical channels and modulation", 3GPP TS 36.211 V12.0.0. Technical Specification Group Radio Access Network. Release 12., (Dec. 2013), 120 pgs.
"Evolved Universal Terrestrial Radio Access (E-UTRA); Physical channels and modulation", ETSI TS 136 211 v11.3.0 (3GPP TS 36.211 version 11.3.0 Release 11). LTE, (Jul. 2013), 110 pgs.
"Evolved Universal Terrestrial Radio Access (E-UTRA); Physical layer procedures", ETSI TS 136 213 V11.3.0 (3GPP TS 36.213 version 11.3.0 Release 11). LTE., (Jul. 2013), 178 pgs.
"Evolved Universal Terrestrial Radio Access (E-UTRA); Physical layer procedures", 3GPP TS 36.213 V12.0.0. Technical Specification Group Radio Access Network. Release 12., (Dec. 2013), 186 pgs.
"Evolved Universal Terrestrial Radio Access (E-UTRA); Study on Small Cell Enhancements for E-UTRA and E-UTRAN—Higher layer aspects", 3GPP TR 36.842 V1.0.0. Technical Specification Group Radio Access Network. Release 12., 69 pgs.
"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 291 pgs.
"General Packet Radio Service (GPRS); Service description; Stage 2", 3GPP TS 23.060 V12.1.0. Technical Specification Group Services and System Aspects. Release 12., (Jun. 2013), 338 pgs.
"IEEE Standard for Air Interface for Broadband Wireless Access Systems", IEEE Std 802.16. IEEE Computer Society. IEEE Microwave Theory and Techniques Society., (Aug. 17, 2012), 2544 pgs.
"IEEE Standard for Air Interface for Broadband Wireless Access Systems: Amendment 1: Enhancements to Support Machine-to-Machine Applications", IEEE Std 802.16p-2012. IEEE Computer Society. IEEE Microwave Theory and Techniques Society., (Oct. 8, 2012), 82 pgs.
"Mobile radio interface Layer 3 specification; Core network protocols; Stage 3", 3GPP TS 24.008 V12.2.0. Technical Specification Group Core Network and Terminals. Release 12., (Jun. 2013), 682 pgs.
"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.
"Part 11: Wireless LAN Medium Access Control (MAC) and Physical Layer (PHY) Specifications: Amendment 3: Enhancements for Very High Throughput in the 60 GHz Band", IEEE Std 802.11ad. Local and metropolitan area networks. IEEE Computer Society., (Dec. 28, 2012), 628 pgs.
Delmas, Jean P., "Chapter 4: Subspace Tracking for Signal Processing", Adaptive Signal Processing: Next Generation Solutions, John Wiley & Sons, Inc., (Jun. 16, 2010), 211-270.
Shirani-Mehr, Hooman, et al., "Practical Downlink Transmission Schemes for Future LTE Systems with Many Base-Station Antennas", IEEE Globecom, (2013), 5 pgs.
Yang, Bang, "Projection approximation subspace tracking", IEEE Transactions on Signal Processing, 43(1), (Jan. 1995), 95-107.
"U.S. Appl. No. 14/141,206, Non Final Office Action mailed Dec. 3, 2014", 13 pgs.
"U.S. Appl. No. 14/141,206, Response filed Apr. 2, 2015 to Non Final Office Action mailed Dec. 3, 2014", 12 pgs.
"U.S. Appl. No. 14/141,223, Non Final Office Action mailed Apr. 14, 2015", 18 pgs.
"Clarification on the scope of ISRP Filter Rule priority", LG Electronics, S2-115168, 3GPP TSG-SA2 Meeting #88, (Nov. 2011), 1-4.
"European Application Serial No. 14171648.0, Extended European Search Report mailed Dec. 22, 2014", 7 pgs.
"U.S. Appl. No. 14/109,211, Advisory Action mailed Aug. 22, 2016", 5 pgs.
"U.S. Appl. No. 14/109,211, Final Office Action mailed Jun. 10, 2016", 17 pgs.
"U.S. Appl. No. 14/109,211, Non Final Office Action mailed Sep. 28, 2016", 18 pgs.
"U.S. Appl. No. 14/109,211, Response filed Aug. 5, 2016 to Final Office Action mailed Jun. 10, 2016", 9 pgs.
"U.S. Appl. No. 14/109,211, Response filed Sep. 12, 2016 to Advisory Action mailed Aug. 22, 2016", 9 pgs.
"U.S. Appl. No. 14/109,211,Response filed Mar. 14, 2016 to Non Final Office Action mailed Dec. 14, 2015", 21 pgs.
"U.S. Appl. No. 14/141,206, Examiner Interview Summary mailed Jan. 25, 2016", 3 pgs.
"U.S. Appl. No. 14/141,206, Examiner Interview Summary mailed Aug. 26, 2015", 3 pgs.
"U.S. Appl. No. 14/141,206, Final Office Action mailed Aug. 24, 2016", 9 pgs.
"U.S. Appl. No. 14/141,206, Non Final Office Action mailed Jan. 7, 2016", 12 pgs.
"U.S. Appl. No. 14/141,206, Response filed May 6, 2016 to Non Final Office Action mailed Jan. 7, 2016", 11 pgs.
"U.S. Appl. No. 14/141,223, Non Final Office Action mailed Jul. 28, 2016", 18 pgs.
"U.S. Appl. No. 14/990,054, Preliminary Amendment filed Jan. 11, 2016", 7 pgs.
"International Application Serial No. PCT/US2014/031996, International Preliminary Report on Patentability mailed Jan. 7, 2016", 6 pgs.
"International Application Serial No. PCT/US2014/044540, International Preliminary Report on Patentability mailed Jan. 7, 2016", 8 pgs.
"International Application Serial No. PCT/US2014/044592, International Preliminary Report on Patentability mailed Jan. 7, 2016", 7 pgs.
"International Application Serial No. PCT/US2014/044606, International Preliminary Report on Patentability mailed Jan. 7, 2016", 16 pgs.
"International Application Serial No. PCT/US2014/044626, International Preliminary Report on Patentability mailed Jan. 7, 2016", 7 pgs.
"International Application Serial No. PCT/US2014/044640, International Preliminary Report on Patentability mailed Jan. 7, 2016", 8 pgs.
"Taiwanese Application Serial No. 103120032, Response filed Dec. 16, 2015 to Office Action mailed Sep. 23, 2015", W/ English Claims, 17 pgs.
"Taiwanese Application Serial No. 103121919, Office Action mailed Dec. 17, 2015", W/ English Search Report, 10 pgs.

(56) References Cited

OTHER PUBLICATIONS

"Taiwanese Application Serial No. 103121919, Response filed Jun. 20, 2016 to Office Action mailed Dec. 17, 2015", W/ English Translation of Claims, 64 pgs.
"3rd Generation Partnership Project; Technical Specification Group Radio Access Network; Evolved Universal Terrestrial Radio Access (EUTRA); Study on Small Cell Enhancements for E-UTRA and E-UTRAN—Higher layer aspects (Release)", 3GPP Standard; 3GPP TR 36.842, 3rd Generation Partnership Project (3GPP), vol. RAN WG2, No. V0.2.0, (May 2013), 38 pgs.
"U.S. Appl. No. 14/109,211, Examiner Interview Summary dated Feb. 23, 2017", 1 pg.
"Discussion on dual RRC", 3GPP Draft; R2-131830 Dual RRC, 3rd Generation Partnership Project (3GPP), Mobile Competence Centre, (May 10, 2013).
"European Application Serial No. 14817060.8, Extended European Search Report dated Mar. 13, 2017", 12 pgs.
"European Application Serial No. 14817448.5, Partial Supplementary European Search Report dated Feb. 16, 2017", 11 pgs.
"European Application Serial No. 14817851.0, Extended European Search Report dated Mar. 2, 2017", 11 pgs.
"European Application Serial No. 14818323.9, Extended European Search Report dated Feb. 23, 2017", 10 pgs.
"Evaluation results for feedback enhancement (Scenario A and C)", LG Electronics: 3GPP Draft; RI-114351 LG Evaluation Results SCNAC, 3rd Generation Partnership Project (3GPP), Mobile Competence Centre; 650, Route Des Lucioles; F-06921 Sophia-Antipolis Cedex; France, vol. RAN WG1, no. San Francisco, USA, (Nov. 21, 2011), 8 pgs.
"Impact of small cell enhancements to RRC functions", 3GPP TSG-RAN WG2 Meeting #82, R2-131672, (May 24, 2013), 6 pgs.
"On the remaining aspects of PMI and RI reporting accuracy tests for eDL-MIMO", Qualcomm Incorporated: 3GPP Draft; R4-114211, 3rd Generation Partnership Project (3GPP), Mobile Competence Centre; 650, Route Des Lucioles; F-06921 Sophia-Antipolis Cedex; France, vol. RAN WG4, no. Athens, Greece, (Aug. 17, 2011), 4 pgs.
"Techniques for D2D Discovery", R1-132503, 3GPP TSG RAN WG1 Meeting #73, (May 2013), 1-7.
Alcatel-Lucent, et al., "Grid of beams for MU-MIMO", 3GPP Draft; RI-100421 GOB, 3rd Generation Partnership Project (3GPP), Mobile Competence Centre; 650, Route Des Lucioles; F-06921 Sophia-Antipolis Cedex; France, vol. RAN WG1, no. Valencia, Spain, (Jan. 12, 2010), 6 pgs.
Alcatel-Lucent, Shanghai Bell, et al., "Considerations on CSI feedback enhancements for high-priority antenna configurations", 3GPP Draft; RI-112420 Considerations on CSI Feedback Enhancements for High-Priority Antenna CONFIGURAT1ONS_CLEAN, 3rd Generation Partnership Project (3GPP), Mobile Competence Centrea; 650, Route Des Lucioles, (Aug. 18, 2011), 7 pgs.
NTT Docomo, "Initial Views on Unified Approach for D2D Discovery", 3GPP Draft; R1132371 D2D Discovery Unified. 3rd Generation Partnership Project (3GPP), Retrieved from the Internet: <URL:http://www.3gpp.org/ftpjtsg ran/WG1 RL1/TSGR173/Docs/>, (May 11, 2013), 7 pgs.
"3GPP TS Group Services and System Aspects(Release 8)", 3GPP TS 23.401, V8.16.0, (Mar. 2012).
"European Application Serial No. 14817214.1, Response filed Jul. 4, 2017 to Extended European Search Report dated Dec. 23, 2016", w/ English Translation, 15 pgs.
"Korean Application Serial No. 10-2015-7033288, Office Action dated Jun. 30, 2017", w/ English Translation, 19 pgs.
"U.S. Appl. No. 14/109,211, Notice of Allowability dated Jun. 23, 2017", 2 pgs.
"U.S. Appl. No. 14/778,528, Non Final Office Action dated Jun. 28, 2017", 22 pgs.
"U.S. Appl. No. 14/990,054, Corrected Notice of Allowance dated Jul. 27, 2017", 2 pgs.
"Chinese Application Serial No. 201410295081.2, Office Action dated Apr. 6, 2017", w/ English Translation, 14 pgs.
"European Application Serial No. 14817448.5, Extended European Search Report dated Jun. 9, 2017", 16 pgs.
"Korean Application Serial No. 2015-7033741, Office Action dated Mar. 18, 2017", With English Translation, 9 pgs.
"Korean Application Serial No. 2015-7033741, Response filed May 18, 2017 to Office Action dated Mar. 18, 2017", w/ English Claims, 26 pgs.
"Taiwanese Application Serial No. 105119738, Response filed May 1, 2017 to Office Action dated Jan. 24, 2017", w/o English Translation, 10 pgs.
"U.S. Appl. No. 14/109,211, Notice of Allowance dated May 30, 2017", 15 pgs.
"U.S. Appl. No. 14/109,211, filed Apr. 21, 2017 to Final Office Action dated Feb. 23, 2017", 14 pgs.
"U.S. Appl. No. 14/141,223, Advisory Action dated May 3, 2017", 3 pgs.
"U.S. Appl. No. 14/141,223, filed May 3, 2017 to Final Office Action dated Jan. 3, 2017", 10 pgs.
"U.S. Appl. No. 14/990,054, Corrected Notice of Allowance dated May 9, 2017", 2 pgs.
"U.S. Appl. No. 14/990,054, Examiner-Initiated Interview Summary dated Mar. 29, 2017", 1 pg.
"U.S. Appl. No. 14/990,054, Notice of Allowance dated Mar. 29, 2017", 12 pgs.

\* cited by examiner

| FLOW | RAT |
|---|---|
| FLOW 1 | RAT 1 |
| FLOW 2 | RAT 2 |
| ⋮ | ⋮ |
| FLOW N | RAT N |

USER EQUIPMENT AND METHOD FOR USER EQUIPMENT FEEDBACK OF FLOW-TO-RAT MAPPING PREFERENCES

RELATED APPLICATION

This application claims the benefit of priority under 35 U.S.C. 119(e) to U.S. Provisional Patent Application Ser. No. 61/841,230, filed Jun. 28, 2013, which is incorporated herein by reference in its entirety.

TECHNICAL FIELD

Embodiments described herein generally relate to wireless networks. Some embodiments relate generally to user equipment feedback in a wireless network.

BACKGROUND

Wireless radio access networks (RAN) enable mobile devices (e.g., radiotelephones, cellular telephones, user equipment (UE)) to communicate within that network with a fixed landline infrastructure (e.g., base station, access point, evolved node B (eNodeB or eNB)). For example, these radio access networks can include WiFi™, $3^{rd}$ Generation Partnership Projects (3GPP), or Bluetooth™.

Typical UEs and landline infrastructure may be equipped with multiple radios, each radio using a different radio access technology (RAT). Most data traffic may be supported over best effort services (e.g., Quality of Service Class Identifier #9 (QCI #9, Bearer)). The QCI #9 typically has real-time flows such as voice over Internet Protocol (VoIP)/conversation and non-real time flows, such as streaming/file downloading. This may not be the best way to handle different flows since each RAT may handle a different flow more efficiently.

There are general needs for improved Flow-to-RAT mapping by a network.

DETAILED DESCRIPTION

Subsequent use of the term radio access technology (RAT) may refer to a radio dedicated to a particular wireless technology. As is known by one of ordinary skill in the art, a RAT refers to an underlying physical connection method for a radio based communication network. Each radio may be configured to support a different RAT (e.g., WiFi™, 3GPP, Bluetooth™, 4G, Long Term Evolution (LTE), wireless local area network (WLAN)). The WiFi™ may be part of an IEEE 802.11 standard.

The term "base station" (BS) may be used subsequently to refer to any fixed transceiver apparatus that may communicate using one or more particular radio technologies. For example, base station can refer to an access point, an eNodeB, or a cell site.

User equipment (UE) and base stations each may include a plurality of radios each associated with a different RAT of multiple RATs that may select various networks or be "steered" to those networks. For example, the UE RATs can employ network selection or traffic steering between different radio access networks (RAN) such as WiFi™, 3GPP, Bluetooth™, 4G, LTE, or other wireless networks. Several solutions, based on UE-centric and network centric techniques may be used for load balancing between one network using a first radio technology (e.g., 3GPP) and second network using a second radio technology (e.g., WLAN).

In current network technology, all flows using a best-effort service may be treated the same. As is known to one of ordinary skill in the art, a best-effort service is a single service model in which an application sends data whenever it must, in any quantity, and without requesting permission or first informing the network. For best-effort service, the network delivers data if it can, without any assurance of reliability, delay bounds, or throughput. In current network technology, the network does not know which flow from the best-effort pipe to be offloaded to another RAT (e.g., WLAN). In such an embodiment, the network typically would offload all of the flows in the best-effort bearer to WLAN.

Using current technology, the UE cannot assist the eNodeB/network with a preference regarding which RAT is better for the kind of application that the UE is executing. This may degrade performance of the applications such as VoIP. The user may end up getting poor service or the user may end up turning off WLAN or the RAT with undesirable QoS. Either scenario may not be desirable for either the network operator or the user.

The present embodiments enable the UE to provide feedback to the network regarding its preference of flow mapping to a BS RAT, of various RATs, in order to assist the BS/network in determining a Flow-to-RAT mapping for the various UEs communicating with the network. The network may use the feedback to determine to offload only one or more of the existing flows, rather than all of them, to other RATs (e.g., WLAN). The decision on which flows are mapped to which RAT may still be made by the base station/network.

Figures 1, 2:
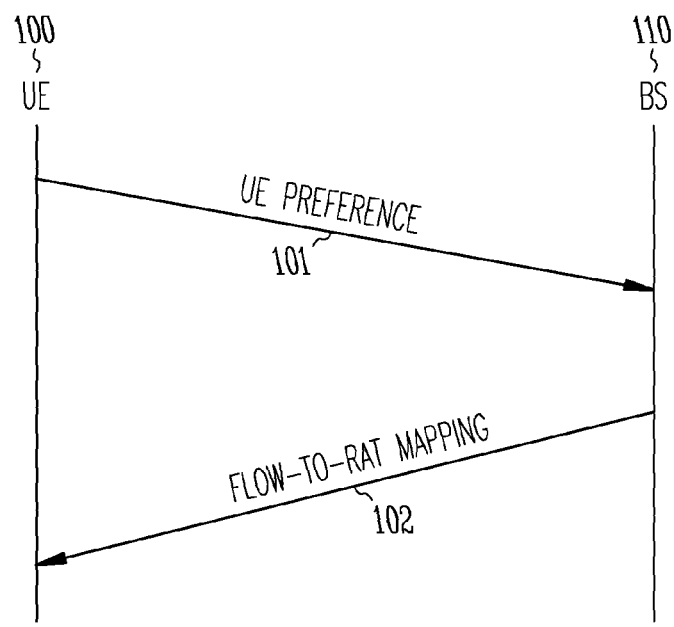
FIG. 1 illustrates an embodiment of a signal flow diagram in accordance with a method for feedback of UE preference for Flow-to-RAT mapping.
FIG. 2 illustrates a table for UE feedback of UE preferences for Flow-to-RAT mapping.

FIG. 1 illustrates a flow diagram of an embodiment of a method for feedback of UE preference for Flow-to-RAT mapping. The UE 100 transmits a message 101 (e.g., assistance message) to the base station 110 (e.g., eNodeB, access point, base station). The message 101 may include the UE preferences for Flow-to-RAT mapping. The UE Preference for Flow-to-RAT mapping may be transmitted as part of another message or as a separate, independent message.

The message 101 from the UE 100 to the BS 110 may include a Flow-to-RAT mapping preference table, such as the table illustrated in FIG. 2. The Flow-to-RAT mapping of this table indicates the mapping preferences of the UE's flows to the RATs of the BS 110. A typical flow entry (e.g., FLOW 1-FLOW N) may include information such as the Internet Protocol (IP) addresses and port number of the source and destination pairs. RAT 1 may be a 3GPP/LTE RAT and RAT 2 may be a WLAN RAT. However, these designations are for purposes of illustration only as the present embodiments are not limited to any certain RAT.

As one example, FLOW 1 is shown in FIG. 2 as having a preference for RAT 1 (e.g., 3GPP/LTE) of the BS. FLOW 2 is shown as also having a preference for RAT 1 of the BS. FLOW N is shown as having a preference for RAT 2 (e.g., WLAN) of the BS.

Referring again to the flow diagram of FIG. 1, the base station 110 transmits a Flow-to-RAT mapping message 102 to the UE 100 in response to the message 101 from the UE 100. The Flow-to-RAT mapping message 102 may be based on the received UE's preference, network loads at RATs, neighboring UEs to the base station 110, and/or other mapping preferences already known by the base station 110.

The BS/network may consider the UE's preference for Flow-to-RAT mapping while splitting the traffic flows over RATs. However, the BS/network may also consider other factors such as network loads in RATs and other UE preferences for Flow-to-RAT mapping, while deciding about the Flow-to-RAT mapping table for the UE. One example of such a mapping table received by the UE is illustrated in FIG. 3.

Figures 3, 4:
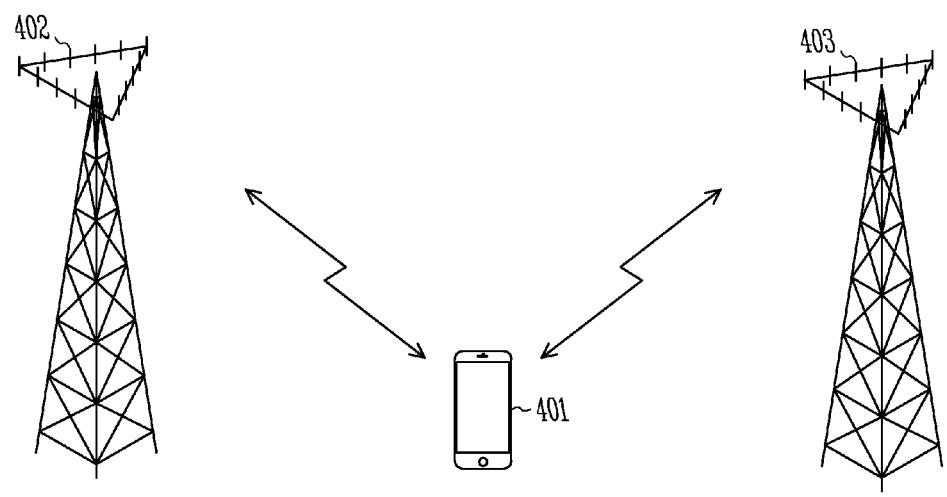
FIG. 3 illustrates a table showing Flow-to-RAT mapping for the UE prepared by the base station/network.
FIG. 4 illustrates a diagram of an embodiment of a communication system.

FIG. 3 illustrates one embodiment of a mapping table for UE prepared at BS/network based on the UE's preference as given in the table of FIG. 2 and network loading in various RATs. Note that, in the illustrated embodiment, the BS/network has not accepted all of the UE's preferences. For example, the BS/network has mapped FLOW 2 to RAT 2 instead of the UE requested RAT 1. This may be due to different load conditions in various RATs of the BS as well as neighboring UEs' preferences that have been received by the BS/network.

In other embodiments, radio resource control (RRC) messages may be used to exchange the mapping table over the UE-BS air interface. The UE may also use capability exchange message at the beginning of the RRC connection to signal whether it supports the preference capability.

FIG. 4 illustrates a diagram of an embodiment of a wireless communication system comprising the UE 401 in a multiple base station environment. The illustrated communication system includes a plurality of antennas 402, 403 for communicating with the UE 401.

The antennas 402, 403 may be part of base stations (e.g., eNodeBs) for communicating in a cellular environment. The antennas 402, 403 may also be part of access points (APs) for communicating in a WiFi environment. For example, the first antenna 402 may be part of an eNodeB to enable the UE 401 to communicate in a 3GPP/LTE environment. The second antenna 403 may be part of an access point to enable the UE 401 to communicate in a WLAN environment.

The method for UE feedback of Flow-to-RAT preferences may be used in the communication system to enable it to seamlessly switch between the 3GPP/LTE environment to the WiFi environment. In such a scenario, the UE 401 may be executing an application that would benefit from using a WLAN RAT of the network side of the system. The UE 401 may transmit this preference to a BS/network 403 as discussed previously. The BS/network 403 may transmit back a Flow mapping table to instruct the UE 401 to use either the preferred RAT or another RAT, as determined by the BS/network, for the particular Flow in question. The UE may then switch to that particular UE RAT when executing that particular Flow.

Figure 5:
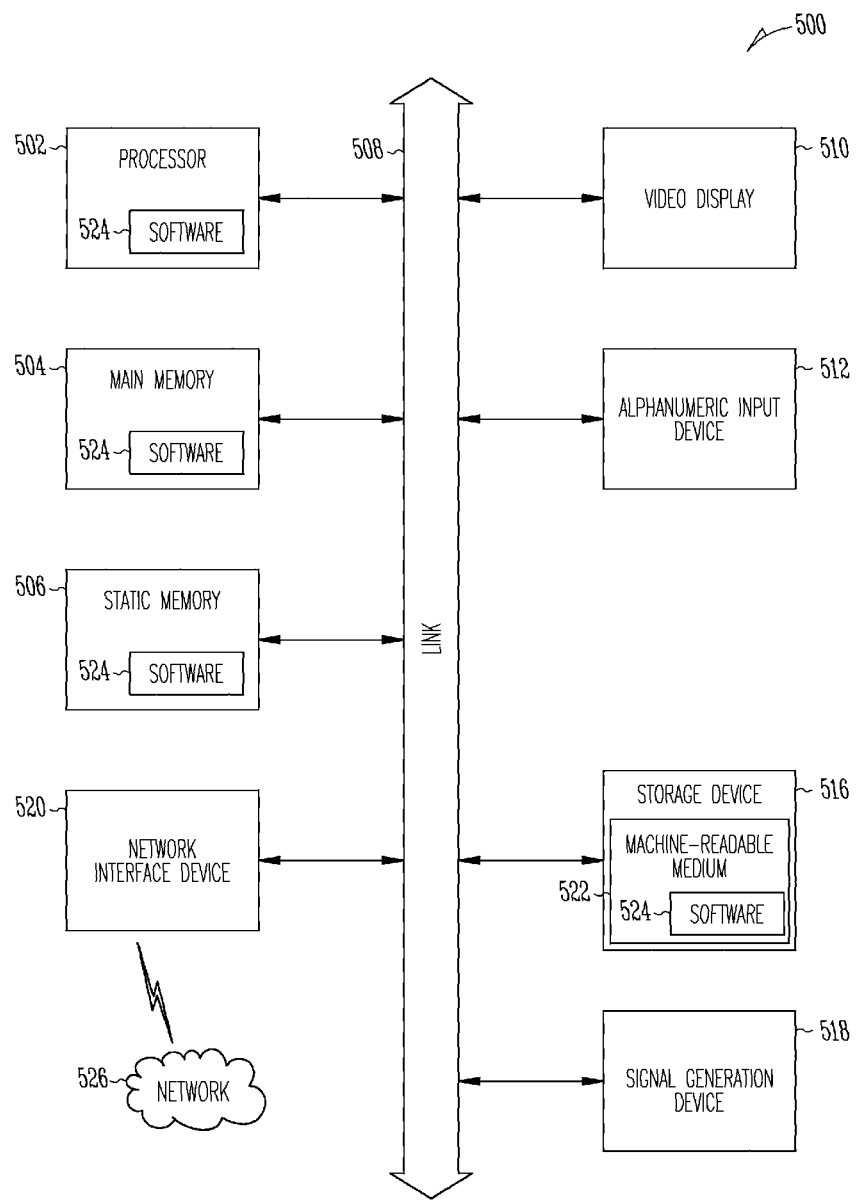
FIG. 5 illustrates a block diagram of an embodiment of user equipment.

FIG. 5 is a block diagram illustrating a machine in the example form of user equipment 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a mobile communication device (e.g., cellular telephone), a computer, a personal computer (PC), a tablet PC, a hybrid tablet, a personal digital assistant (PDA), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example user equipment 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The user equipment 500 may further include a video display unit 510 and an alphanumeric input device 512 (e.g., a keypad). In one embodiment, the video display unit 510 and input device 512 are incorporated into a touch screen display. The user equipment 500 may additionally include a storage device 516 (e.g., a drive unit), a signal generation device 518 (e.g., a speaker), a network interface device 520, and one or more sensors (not shown).

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the user equipment 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), a wireless local area network (WLAN) the Internet, mobile telephone networks, plain old telephone (POTS) networks, and wireless data networks (e.g., WI-FI™ (IEEE 802.11), 3GPP, 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software. The network interface device may include one or more antennas for communicating with the wireless network.

What is claimed is:

1. A method for user equipment (UE) feedback of Flow-to-radio access technology (RAT) preferences in a wireless network, the method comprising:
    the UE transmitting a preference for Flow-to-RAT mapping to a base station of the wireless network, wherein the preference for Flow-to-RAT mapping comprises a table of preferences for a plurality of UE Flows, each UE flow associated with an indication for a preferred RAT and Flow entries in the table of preferences comprises Internet Protocol addresses and port numbers of source and destination pairs, wherein the transmitting the preference includes the UE transmitting a capability exchange message prior to or during a radio resource control (RRC) connection to signal support for a Flow-to-RAT preference capability; and
    the UE receiving a Flow-to-RAT mapping from the base station, wherein the Flow-to-RAT mapping includes a RAT assigned to each respective UE flow by the base station and is based on neighboring UE RAT preferences that have been received by the base station.

2. The method of claim 1 wherein the UE receives an indication from the base station regarding a split of best effort traffic flows to a plurality of RATs of the UE.

3. The method of claim 1 wherein the UE transmitting the preference for the Flow-to-RAT mapping comprises a radio resource control message.

4. The method of claim 1 wherein the Flow-to-RAT mapping from the base station is based on the UE preference, network loads at base station RATs, and neighboring UEs to the base station.

5. The method of claim 1 wherein the UE receiving the Flow-to-RAT mapping from the base station comprises receiving the Flow-to-RAT mapping that does not equal the UE preference for Flow-to-RAT mapping.

6. The method of claim 1 wherein the UE transmitting the performance metrics to the second radio comprises the UE transmitting the performance metrics during session transfer.

7. User equipment (UE) for operating in a wireless network, the user equipment comprising:
    a network interface device to communicate with a plurality of base stations, the network interface device to transmit a UE preference Flow-to-radio access technology (RAT) mapping to a base station of the plurality of base stations and receive a Flow-to-RAT mapping from the base station, wherein the UE preference Flow-to-RAT mapping comprises a table of preferences for a plurality of UE Flows, each UE flow associated with an indication for a preferred RAT, wherein the UE preference transmission to the base station includes a capability exchange message prior to or during a radio resource control (RRC) connection to signal support for a Flow-to-RAT preference capability and the Flow-to-RAT mapping includes a RAT assigned to each respective UE flow by the base station and is based on neighboring UE RAT preferences that have been received by the base station;
    a plurality of radios, each radio to operate on a different RAT; and
    a processor coupled to the network interface and the plurality of radios to control operation of the user equipment and dynamically switch each UE flow to the RAT specified by the received Flow-to-RAT mapping from the base station when a flow of the Flow-to-RAT mapping is executed.

8. The user equipment of claim 7 wherein each radio of the plurality of radios is configured to operate on one of IEEE 802.11, 3GPP, 4G LTE/LTE-A, WLAN, or WiMAX network radio access technology.

9. A non-transitory computer-readable storage medium that stores instructions for execution by one or more processors to perform operations for user equipment (UE) feedback of Flow-to-radio access technology (RAT) preferences in a wireless network, the operations causing the UE to:
    transmit a preference for Flow-to-RAT mapping to a base station of the wireless network, wherein the preference for Flow-to-RAT mapping comprises a table of preferences for a plurality of UE Flows, each UE flow associated with an indication for a preferred RAT and Flow entries in the table of preferences comprises Internet Protocol addresses and port numbers of source and destination pairs, where the UE transmitting the preference to the base station includes transmitting a capability exchange message prior to or during a radio resource control (RRC) connection to signal support for a Flow-to-RAT preference capability; and
    receive a Flow-to-RAT mapping from the base station, wherein the Flow-to-RAT mapping includes a RAT assigned to each respective UE flow by the base station and is based on neighboring UE RAT preferences that have been received by the base station.

* * * * *

UNITED STATES PATENT AND TRADEMARK OFFICE
CERTIFICATE OF CORRECTION

PATENT NO. : 9,794,870 B2  
APPLICATION NO. : 14/136554  
DATED : October 17, 2017  
INVENTOR(S) : Vannithamby et al.

Page 1 of 1

It is certified that error appears in the above-identified patent and that said Letters Patent is hereby corrected as shown below:

On the Title Page

On page 3, in Column 2, item (56), under "Other Publications", Line 49, delete "14/990.054," and insert --14/990,054,-- therefor On page 4, in Column 1, item (56), under "Other Publications", Line 7, delete "(Release"," and insert --(Release 12)",-- therefor On page 4, in Column 2, item (56), under "Other Publications", Line 36, before "filed", insert --Response--

On page 4, in Column 2, item (56), under "Other Publications", Line 40, before "filed", insert --Response--

Signed and Sealed this  
Twenty-eighth Day of May, 2019

Andrei Iancu  
*Director of the United States Patent and Trademark Office*